United States Patent [19]

Nishiyama

[11] Patent Number: 4,881,180

[45] Date of Patent: Nov. 14, 1989

[54] CHARACTER IMAGE GENERATING CIRCUIT

[75] Inventor: Masaaki Nishiyama, Toyohashi, Japan

[73] Assignee: Minolta Camera Kabushiki Kaisha, Osaka, Japan

[21] Appl. No.: 21,456

[22] Filed: Mar. 4, 1987

[30] Foreign Application Priority Data

Mar. 5, 1986 [JP] Japan .................................. 61-49059

[51] Int. Cl.⁴ .............................................. G01D 15/06
[52] U.S. Cl. .................................... 364/518; 364/521; 340/731
[58] Field of Search ................. 364/518, 521; 340/748, 340/799, 740, 731

[56] References Cited

U.S. PATENT DOCUMENTS

| | | | |
|---|---|---|---|
| 4,107,662 | 8/1978 | Endo et al. .................. | 340/324 AD |
| 4,149,145 | 4/1979 | Hartke et al. .................. | 340/739 |
| 4,233,601 | 11/1980 | Hankins et al. ................ | 340/703 |
| 4,338,673 | 7/1982 | Brown ............................ | 364/523 |
| 4,418,345 | 11/1983 | Demke et al. .................. | 340/731 |
| 4,555,802 | 11/1985 | Fedak et al. ................... | 382/56 |
| 4,591,850 | 5/1986 | Lundström ..................... | 340/799 |
| 4,610,026 | 9/1986 | Tabata et al. .................. | 382/47 |
| 4,694,405 | 9/1987 | Bradbury et al. .............. | 364/518 |
| 4,729,107 | 3/1988 | Hasegawa et al. .............. | 364/519 |
| 4,754,487 | 6/1988 | Newmuis ........................ | 382/2 |
| 4,777,620 | 10/1988 | Shimoni et al. ................ | 364/900 |
| 4,783,841 | 11/1988 | Crayson ......................... | 382/56 |

FOREIGN PATENT DOCUMENTS 8502930 7/1985 World Int. Prop. O. .......... 340/748

Primary Examiner—Gary V. Harkcom
Assistant Examiner—Phu K. Nguyen
Attorney, Agent, or Firm—Price, Gess & Ubell

[57] ABSTRACT

A character image generating circuit includes a text buffer for storing character code data corresponding to one page, a first memory for storing character image data corresponding to a section of one page, and a second memory for storing compressed character image data corresponding to one page. A depiction control unit coupled with a font memory is provided for converting the character code data, a section at a time from the text buffer, to character image data which is temporarily stored in the first memory. The depiction control unit also compresses the character image data obtained from the first memory to produce compressed character image data which is stored in the second memory. The second memory further receives compressed character image data of other sections. A reconstruction circuit is provided for reconstructing the compressed character image data of one page from the second memory back to the original character image data.

2 Claims, 3 Drawing Sheets

CHARACTER IMAGE GENERATING CIRCUIT

BACKGROUND OF THE INVENTION

1. Field of the Invention

The present invention relates to a character image generating circuit of a bit map system.

2. Description of the Prior Art

Generally, a character image generating circuit of a bit map system has a full page bit map memory which temporarily carries character image data of one full page in a dot pattern comprising "1s" and "0s". An output device, such as a printer, connected to the bit map memory visualizes the image data by providing dots at places where "1s" are located. Therefore, the "character image data" not only carries the information of characters, but also it carries information of specific style of the characters, e.g., whether they are italic, gothic, elite, etc.

A character image generating circuit employing a bit map memory is schematically illustrated in FIG. 1. As shown, a host computer 1, such as a word processor or a computer, supplies a "character code data" to a character generator 3 through a host interface 2.

In contrast to "character image data", the term "character code data" only carries the information of characters. Therefore, the amount of data necessary to represent one character by the character image data is greater than that represented by the character code data. Here, the term "character" includes not only an alphabet or a number, but also a symbol or a sign used in a sentence or a mathematical formula and various graphic information.

The character code data is supplied and stored in a text buffer 4. When character code data of one full page is stored in the text buffer 4 in the form of series of character code data, the series of character code data is applied to a font memory 5 in which each character code data is converted into a character image data of a dot pattern having a specific character figure. The character image data from font memory 5 is then applied to a bit map memory 6 until one full page is stored.

The character image data stored in the bit map memory is applied through a parallel-serial converter 7 to a printer, for example, a laser printer including a laser optical system 8 and an electrophotographic system 9, which is operable to make a print of the character image data stored in the bit map memory.

The character image generating circuit employing the bit map memory is advantageous in that fine control is possible to provide all details of the characters and also to provide the printing position and the printing direction.

However, according to the prior art character image generating circuit employing the bit map memory, the bit map memory must have a very large storage capacity corresponding to one full page. For example, in order to print an A3 size paper at a resolution of 480 dpi (dots per inch), it is necessary to use a RAM (random access memory) of about 5.7 megabytes for the bit map memory, which RAM is very high in cost. As the resolution and/or paper size increases, (for example, the paper size increases from A4 size to A3 size), the cost of the bit map memory increases remarkably.

SUMMARY OF THE INVENTION

The present invention has been developed with a view to substantially solving the above described disadvantages and has for its essential object to provide an improved character image generating circuit provided with a compact bit map memory having a storage capacity smaller than a full page bit map memory but capable of performing a function corresponding to that having a full page storage capacity.

In accomplishing these and other objects, the improved character image generating circuit according to the present invention comprises a text buffer for storing character code data corresponding to one page, a first memory for storing character image data corresponding to a section or fractional portion of one page, and a second memory for cumulatively storing compressed character image data corresponding to one page. A depiction control unit coupled with a font memory is provided for converting the character code data, a section at a time from the text buffer, to character image data which is temporarily stored in the first memory. The depiction control unit also compresses the character image data obtained from the first memory to produce compressed character image data which is cumulatively stored in the second memory. The second memory further receives compressed character image data of other sections. A reconstruction circuit is provided for reconstructing the compressed character image data of one page from the second memory back to the original character image data.

DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
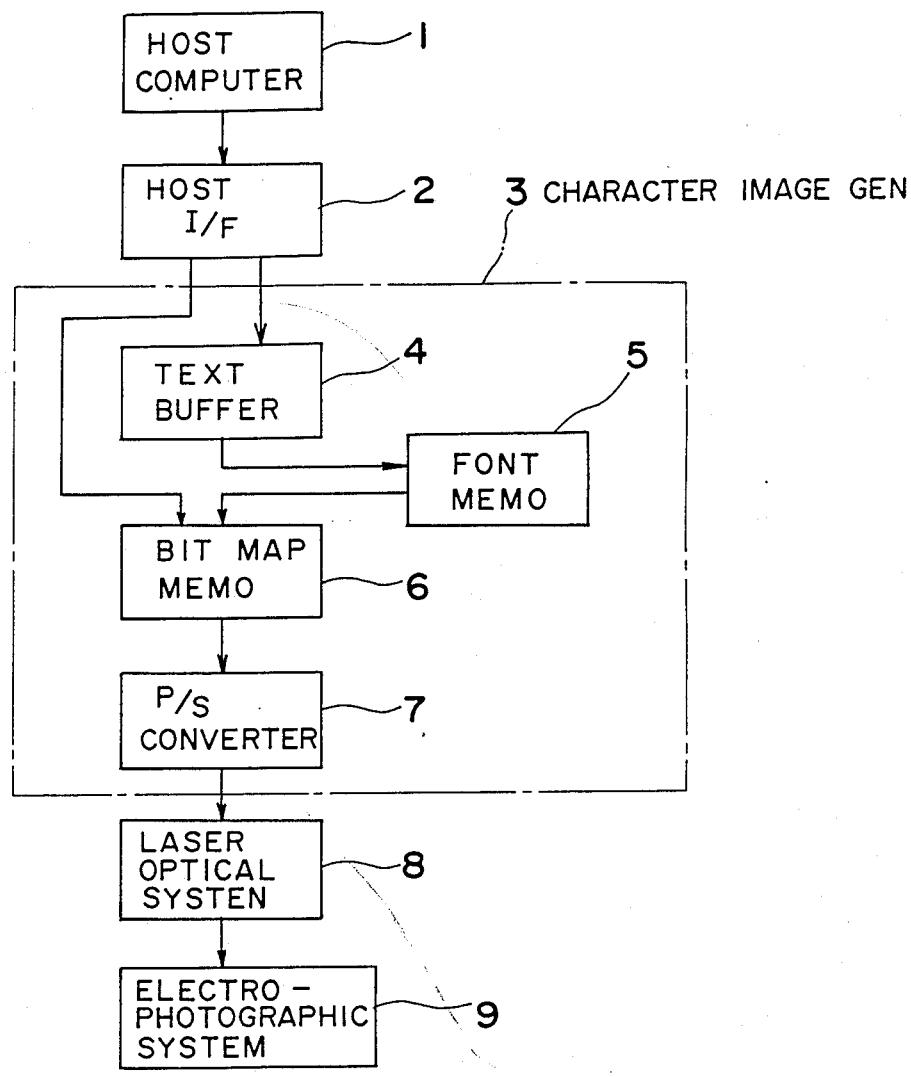
FIG. 1 is a block diagram of a character image generating circuit according to prior art.
Figure 2:
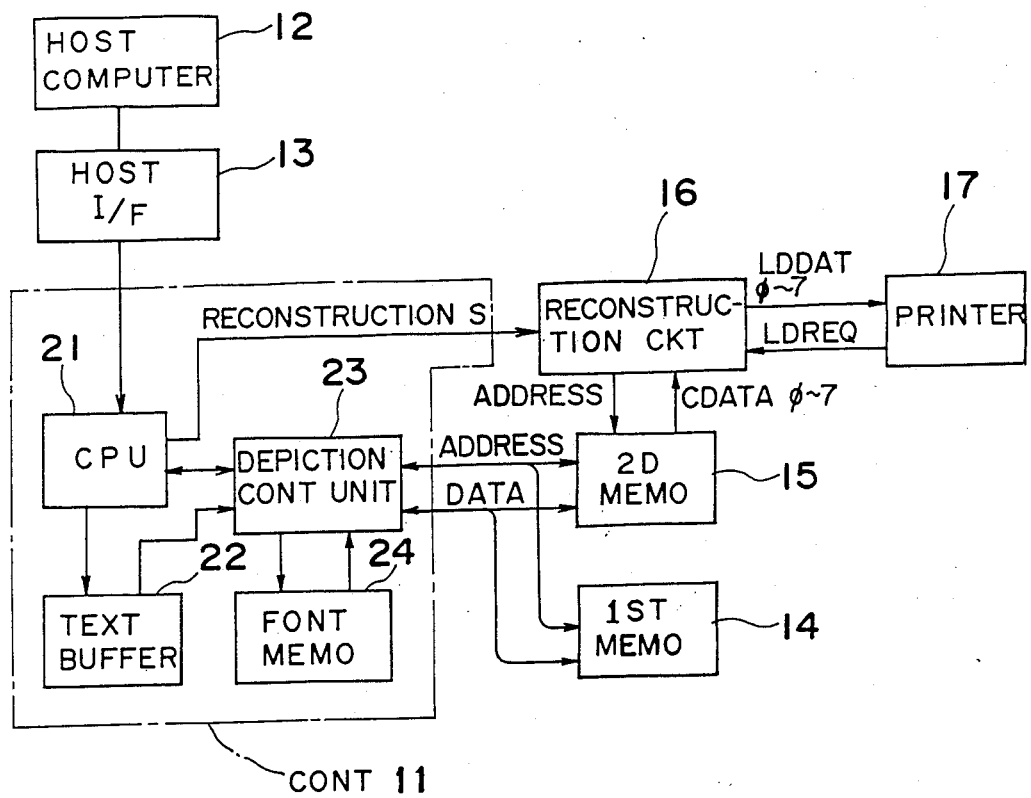
FIG. 2 is a block diagram of a character image generating circuit according to the present invention.

Referring to FIG. 2, a block diagram of a character image generating circuit according to one embodiment of the present invention is shown. A host computer 12, such as a word processor or a computer, is provided for feeding character code data to a microprocessor (CPU) 21 through a host interface 13. The character code data is then stored in a text buffer 22. When character code data of one page is stored in the text buffer 22, CPU 21 generates a page end signal which is provided to a depiction control unit 23.

In response to the page end signal, the depiction control unit 23 starts reading sequentially the character code data stored in text buffer 22, and converts the read character code data to character image data. During the data conversion from the character code data to character image data, depiction control unit 23 receives font data from a font memory 24 for determining the style of the character. The character image data, having a data length which may prolonged depending on the resolution and as produced from depiction control unit 23, is stored in a first memory 14 which serves as a compact bit map memory.

When a predetermined amount of character code data, such as quarter of the total character code data stored in text buffer 22, has been converted to the character image data and stored in the first memory 14, the depiction control unit 23 stops the converting operation, and instead starts a compressing operation, which is carried out by receiving the character image data from the first memory 14 and compressing the character image data according to a known compressing method, such as a Run Length Coding method (more specifically, a Modified Hoffman method disclosed, for example, in U.S. Pat. No. 4,555,802 or in Japanese Patent Publication (unexamined) No. 59-175270). The compressed character image data is applied and stored in a second memory 15.

The converting and compressing operation cycle as described above is repeated for a number of times, such as four in the above exemplification, so that all the character code data in text buffer 22 are converted, compressed and stored in the second memory 15. When all the character code data in text buffer 22 are compressed and stored in the second memory 15, depiction control unit 23 generates a compression end signal which is provided to CPU 21.

Thereafter, CPU 21 produces a reconstruction signal which is applied to a reconstruction circuit 16. In response to the reconstruction signal, reconstruction circuit 16 sequentially reads the compressed data from the second memory 15 through lines CDATA0-7 and reconstructs the compressed data to the normal character image data which is then applied to a printer 17 through lines LDDAT0-7 in response to a signal LDREQ from printer 17.

Figure 3:
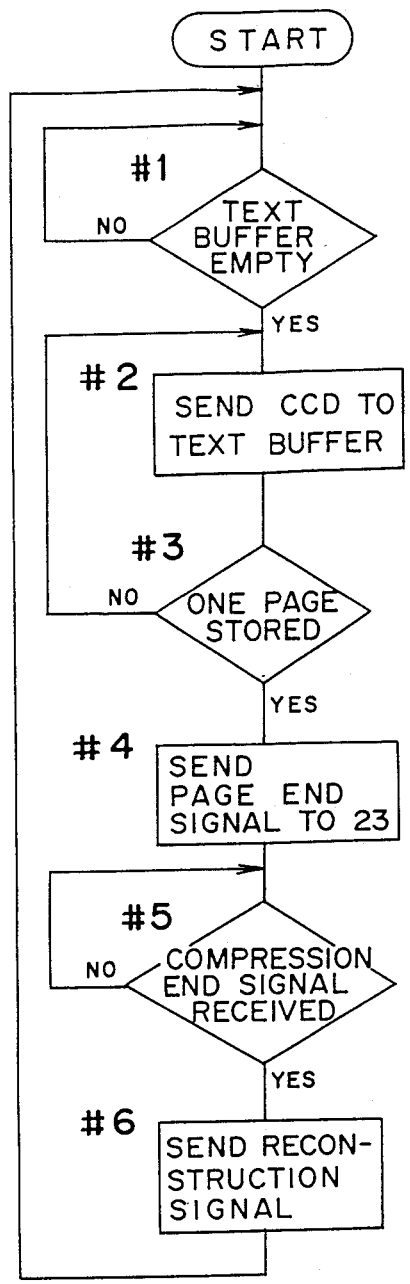
FIG. 3 is a flow chart showing an operation of the circuit shown in FIG. 2.

The operation as performed by CPU 21 will now be described with reference to FIG. 3.

At step #1, a decision is made so as to determine whether or not any data is stored in the text buffer 22. If no data is stored in the text buffer 22, the character code data is supplied from the host computer 12 (for example, in ASCII code) to text buffer 22 at step #2. The sending of the character code data continues until one page of the character code data is stored in the text buffer 22 (step #3). Then, the page end signal is supplied to depiction control unit 23 (at step #4). Thereafter, at step #5, the conversion and compression procedure is carried out, as will be described in detail in connection with FIG. 4. Then, when the compression end signal is produced from depiction control unit 23, CPU 21 produces the reconstruction signal to reconstruction circuit 16 (step #6). Thus, in response to the reconstruction signal, the compressed data is sequentially expanded to the character image data and is applied to printer 17.

Figure 4:
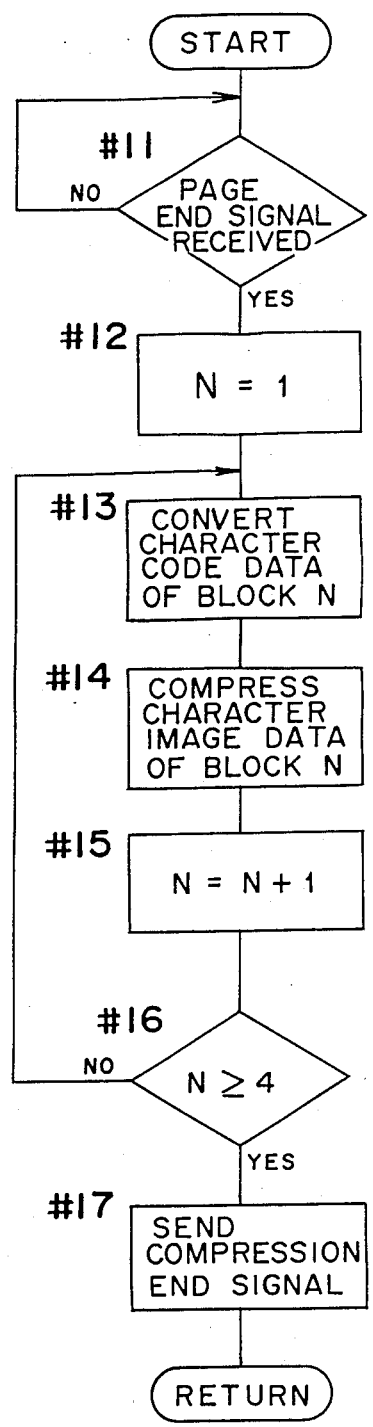
FIG. 4 is a flow chart showing an operation of compressing the one page character image data.

Referring now to FIG. 4, the compression procedure as carried out by depiction control unit 23 will be described in detail. At step #11, it is detected whether or not the depiction control unit 23 has received the page end signal from CPU 21, as produced when one page of the character code information is written in the text buffer 22.

Figure 5:
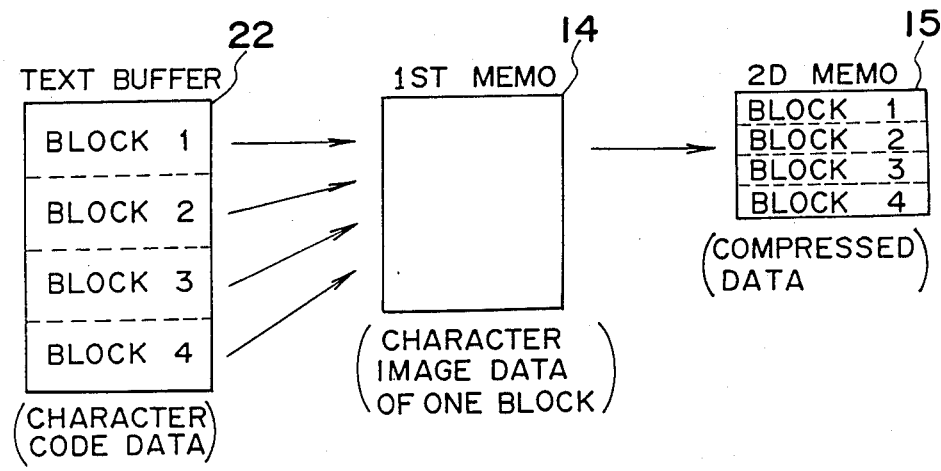
FIG. 5 is a diagrammatic view showing a manner in which the character image data is compressed.

As diagrammatically shown in FIG. 5, the character code data stored in text buffer 22, according to the present embodiment, are divided into four blocks which are being processed block by block sequentially in the depiction control unit 23. In the first cycle of operation, N is rendered to be 1 at step #12 for processing the character code data in the first block. Thus, the character code data in the first block 1 are serially converted to character image data with reference to the font memory 24 and are stored in the first memory 14 at step #13.

Thereafter, the depiction control unit 23 reads the contents of the first memory 14, and compresses the character image data according to the run length coding method, for example Modified Hoffman coding method, and then the compressed data are sequentially stored in the second memory 15 at step #14.

When the entire contents of the first memory 14 have been completely compressed and written into the second memory 15, N is incremented by one at step #15. Thereafter, a decision is made at step #16 to determine if N is greater than 4. If N is not greater than 4, the program repeats steps #13–#15 to process the next succeeding block. When all the blocks have been processed in steps #13–#15, the compression end signal is applied to CPU 21 at step #17.

In the prior art character image generating circuit, a bit map memory is provided which has a storage capacitor of about 5.7 megabytes for storing the full page data on a A3 size sheet, whereas according to the present invention, the storage capacity of the first memory 14 is of a value, for example, 2 megabytes, which is slightly greater than one quarter of 5.7 megabytes, and yet providing the same detail of the character image.

Also, the compression ratio according to the run length method is about one eighth, and accordingly, the storage capacity of the second memory 15 is one eighth of the bit map memory. Therefore, according to the embodiment described above, the storage capacity for the first and second memory is approximately equal to $$\tfrac{1}{4} + \tfrac{1}{8} = \tfrac{3}{8}$$

of the full bit map memory as required in the prior art character image generating circuit.

Thus, it is clear that, according to the present invention, since second memory 15 is employed to store the compressed version of the character image data, the storage capacity required for a first memory 14 can be minimized, making it possible to reduce the cost thereof.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A character image generating circuit which converts character code data to character image data of a dot pattern of specific character figures to be printed based on font data stored in a font memory and which applies the character image data to a printer, comprising:
   first storing means for storing the character code data;
   second storing means for temporarily storing the character image data of the dot pattern corresponding to one of a plurality of fractional portions of the character image data of one page to be printed;
   third storing means for cumulatively storing compressed character image data of each of the plurality of fractional portions of the character image data temporarily stored in the second storing means, whereby the third storing means will contain compressed character image data corresponding to one page to be printed;

depiction control means for converting to character image data a predetermined portion of the character code data stored in the first memory means that corresponds to one of the plurality of fractional portions of character image data to be temporarily stored in said second storing means, and for compressing said character image data temporarily stored in said second storing means to produce compressed character image data which is cumulatively stored in said third storing means until said third storing means contains compressed character image data corresponding to one page to be printed by repeating the conversion of the character code data and the compression of the character image data for each of the successive fractional portions of one page to be printed; and reconstruction means for reconstructing said compressed character image data from said third storing means back to original character image data and applying said reconstructed character image data to the printer.

2. A method for converting character code data to character image data of a dot pattern of specific character figures to be printed and for applying the character image data to a printer, comprising the steps of:

storing the character code data of one page in a first storing means;

converting a portion of said character code data in said first storing means to the character image data of the dot pattern corresponding to a section of one page to be printed;

storing said character image data corresponding to said section of one page in a second storing means;

compressing said character image data in second storing means and producing compressed character image data;

storing said compressed character image data in a third storing means;

repeating said converting step, said character image data storing step, said compressing step and said compressed character image data storing step until the compressed character image data corresponding to one page is stored in said third storing means; and reconstructing said compressed character image data in said third storing means back to original character image data and applying reconstructed character image data to the printer.

* * * * *